June 2, 1964  J. ZENZIC  3,135,154
LOCKING AND TENSION INDICATING WASHER NUT DEVICE
Filed April 26, 1961  2 Sheets-Sheet 1

*INVENTOR.*
JOHN ZENZIC
BY
R. E. Geangue
ATTORNEY

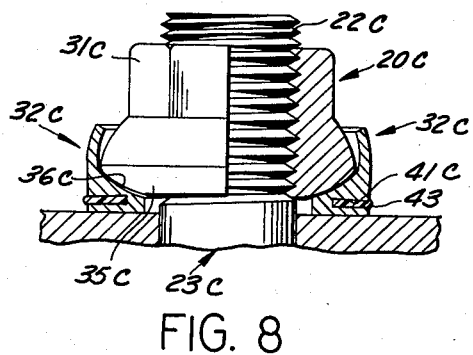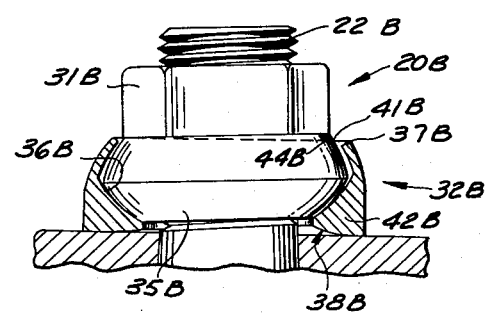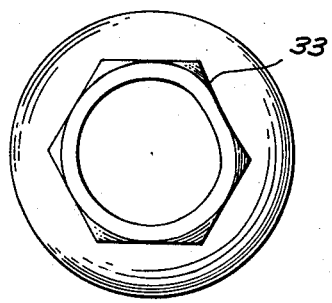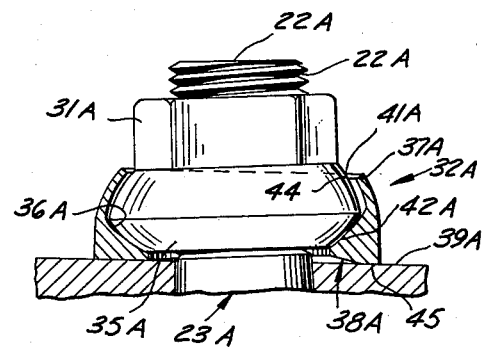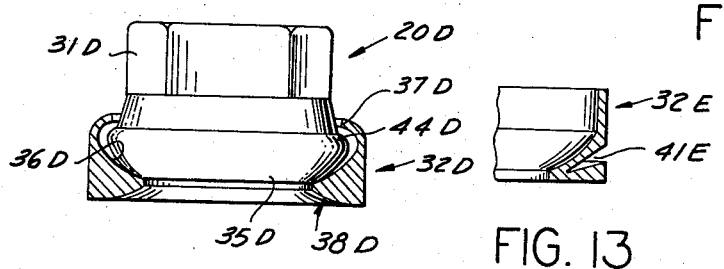

United States Patent Office 3,135,154
Patented June 2, 1964

3,135,154
LOCKING AND TENSION INDICATING
WASHER NUT DEVICE
John Zenzic, Portuguese Bend, Calif.
(P.O. Box 27, Incline Village, Nev.)
Filed Apr. 26, 1961, Ser. No. 105,598
1 Claim. (Cl. 85—62)

This invention relates to a locking washer-nut device and, more particularly, to a threaded nut which is threadable onto the threaded end of a bolt for abutment against structural means having a hole through which the bolt extends, with the threaded nut being provided with captive washer means rotatively mounted with respect to the nut for unlimited rotation around a common central axis and for universal movement of limited angular extent in any direction across said axis whereby to provide for correction of misalignment of the bolt with respect to the structural means, or for variations in the surface contour of the structural means from a true perpendicular relationship with respect to a longitudinal central axis of the bolt—this adjustment being provided by the universal movement of the washer in abutment with the structural means with respect to the nut in threaded engagement with the threaded end of the bolt. Furthermore, the captive washer is adapted to be drawn into locking engagement with respect to the surface of the structural means carrying the bolt as a result of threaded advancement of the nut on the threaded end of the bolt. Also, in one preferred form of the invention, the captive washer is provided with effective spring means adapted to be deflected as a result of being drawn into forced engagement with the structural member by threaded advancement of the nut on the threaded end of the bolt whereby to facilitate the locking engagement of the washer against the surface of the structural means and also whereby the degree of deflection of the spring means comprises a measure of the tension applied to the bolt through the nut and washer. This deflection, in one form of the invention, is directly measured by suitable thickness or feeler gauge means whereby to indicate the tension and, in another form of the invention, is measured by providing extrudable, deformable, tension-indicating means positioned in the path of said deflection whereby to be forcibly extruded to an extent which comprises a measure of the tension applied to the bolt through the nut and washer.

The invention may cooperate with any type of threaded bolt for abutment against any type of structural means, such as a single structural member or a plurality of structural plates adapted to be fastened together to provide a joint. However, the invention is particularly well adapted for use with a tapered locking bolt of the type specifically defined and claimed in applicant's co-pending patent application, Serial No. 733,517, filed May 7, 1958, now Patent No. 3,034,611, for a "Tapered Locking Device," for clamping and fastening together a plurality of structural members of thin-sheet form whereby to provide a high-strength, aircraft-type of joint wherein the tapered bolt is drawn by the locking washer-nut device of the present invention into a similarly tapered hole through the sheets which are to be fastened together so as to provide a desired degree of interference fit in a manner providing a continuous pre-loaded or pre-stressed condition along the length of the aligned hole means through the joined sheets. While the locking washer-nut device of the present invention is particularly well adapted to cooperate with such a tapered locking bolt, it is not specifically so limited and may cooperate with a great variety of different types of threaded fasteners for abutment against a structural member through which such a threaded fastener extends.

At present, various types of lock nuts are utilized for threaded engagement with the threaded end of a bolt and for locking, non-slipping abutment with a structural member through which the bolt extends. In certain cases, such prior art lock nuts may provide for small irregularities in the abutted surface of the structural member through which the bolt extends by reason of deformation of the base of the nut thereagainst. However, such prior art lock nuts are not capable of providing correction for substantial degrees of misalignment of the bolt with respect to the surface abutted by the nut since such deformation can be of a limited extent only if the nut is to be of sufficient strength to provide a high strength fastened joint. In other words, such prior art lock nut devices do not provide for correction of substantial degrees of misalignment of the nut with respect to the abutted surface while maintaining a great strength in the fastened joint. Furthermore, the prior art lock nuts do not provide means for clearly indicating the degree of tension applied to the bolt by the abutting engagement of the lock nut with the abutted surface of the structural member carrying the bolt.

The locking washer-nut device of the present invention serves both to correct substantial degrees of misalignment of the nut and the abutted surface of the structural member carrying the bolt and to provide a self-locking arrangement including effective spring means adapted to be deflected during forced abutment of the captive washer against the surface of the structural member carrying the bolt in a manner such as to provide a clear indication of the amount of tension applied to the bolt through the nut and washer. The locking washer-nut of the present invention includes a nut having an interiorly threaded portion which is threadable onto the remote threaded end portion of a bolt having an enlarged head at the opposite end thereof so that said nut can be tightened against the outside of one or more structural members having hole means therethrough carrying the shank of the bolt, the nut being on the opposite side of the one or more structural members from the bolt head and in a position such as to pull the shank of the bolt through the hole means in a manner such as to effectively clamp the structural members and fastened bolt and washer-nut device together when a selected torque is applied to the nut.

In one preferred form of the present invention, the means for providing a limited degree of universal angular movement in any direction of the captive washer with respect to the nut takes a form wherein the nut is provided with a downwardly directed partially spherical or frusto-spherical base portion and wherein the captive washer means is provided with a similar upwardly directed partially spherical or frusto-spherical receiver portion rotatably receiving and retaining the frusto-spherical base portion of the nut for unlimited rotation around a common central axis and for limited universal relative angular movement in any desired direction across said common central axis whereby to provide for correction of misalignment of the nut and the surface of a structural member which is to be forcibly abutted by the washer as a result of threaded advancement of the nut on the threaded end of a bolt which is carried in a hole in the structural member.

In one version of the above-mentioned preferred form of the invention, the frusto-spherical base portion of the nut has a spherical radius of curvature greater than the spherical radius of curvature of the frusto-spherical receiver portion of the captive washer whereby to cause the nut base to bear on an outer part of the receiver portion positioned above relief, clearance, or groove means carried by the captive washer below the receiver means and comprising a circular inwardly directed groove separating the bottom contacting or engaging surface of the washer from the upper receiver portion thereof whereby threaded advancement of the nut on the threaded portion of a bolt will cause the frusto-spherical base portion of the nut to forcibly move the frusto-spherical receiver portion of the captive washer downwardly so as to effectively vary the clearance space in said groove. This arrangement, wherein the lower portion of the captive washer between the groove and the contacting or engaging surface of the washer effectively comprises spring means, may be used for indicating the amount of tension applied to the bolt through the nut and washer. This may be determined as a direct function of the variation of the clearance space in the relief or clearance groove around the captive washer. This clearance space may be directly measured by suitable thickness or feeler gauge means calibrated in terms of tension or direct measurement or may be effectively measured by tension-indicating means comprising an extrudable resilient material such as rubber, nylon, Teflon, or the like, initially carried in said relief or clearance groove around the captive washer and adapted to be extruded outwardly therefrom to a degree determined by the amount of tension applied to the bolt through the nut and washer.

In another version of the above-mentioned preferred form of the invention, the frusto-spherical base portion of the nut has a spherical radius of curvature less than the spherical radius of curvature of the frusto-spherical receiver portion of the captive washer whereby to cause the nut base to bear on an inner part of the receiver portion whereby to inwardly deflect a retaining lip portion carried at the top of the captive washer and normally circularly outwardly spaced from the upper part of the base portion of the nut whereby to define a circular relief or clearance opening or space; said inward deflection of the retaining lip portion and the effective reduction in said circular relief or clearance opening occurring as a result of forcible engagement of an outer initial contact portion of the bottom of the washer against an abutted surface when the nut is threadedly advanced on the threaded end of a bolt whereby to effectively rotate the side wall part of the washer between the bottom thereof and the upper retaining lip (which effectively comprise spring means) so that variation in said circular relief or clearance opening between the retaining lip portion and the upper part of the base portion of the nut is a direct indication of the amount of tension applied to the bolt through the nut and washer. This may be measured by suitable thickness or feeler gauge means or outside diameter gauge means calibrated in terms of tension or may be measured by tension-indicating means comprising extrudable resilient material positioned in said circular relief or clearance opening and adapted to be forcibly extruded to a degree indicating the tension applied to the bolt through the nut and washer.

The spherical radii of curvature of the frusto-spherical nut base and the frusto-spherical receiver of the washer are concentric on a common vertical center line or central axis for both the nut and washer. In certain forms of the invention, the contacting or engaging bottom surface of the washer is provided with frictional means for non-slipping abutting contact with the outside of the structural means carrying the bolt. The nut and captive washer of the present invention are preferably constructed of high-strength alloy steel or other high-strength metals, although in certain forms of the invention, the nut is constructed of aluminum alloy, or the like. This is particularly true where many nuts are to be employed for fastening a similar number of bolts to structural members. However, in those cases where fewer bolts and nuts are employed for fastening structural members together, both the bolts and nuts will normally be of high-strength alloy steel, usually heat treated for maximum performance. In one preferred form, the nut, or at least the threaded portion of the nut, is slightly softer than the threads of the threaded end of the bolt to which it is adapted to be fastened whereby to create tension rather than torsion as the nut is tightened against the surface of a structural member carrying the bolt. Also, in one preferred form of the invention, the threaded portion of the nut is deformed prior to attachment to the threaded end of a bolt so that the nut becomes frictionally locked to the threaded end of the bolt as it assumes the shape of the threaded end of the bolt upon threaded advancement of the nut thereon. Also, in one preferred form of the invention, the lower portion or inner end of the nut contains a threadless or unthreaded counterbore which can receive a small length of the unthreaded shank portion of the bolt so that the intermediate or shank portion of the bolt can extend completely through the hole in the members or plates forming a joint. This is particularly important when the locking washer-nut device of the present invention is employed with a tapered bolt and correspondingly tapered hole through the structural members to be joined of the type specifically described and claimed in applicant's co-pending patent application, Serial No. 733,517, filed May 7, 1958, now Patent No. 3,034,611. Thus, the shank of the bolt can extend slightly beyond the joint and into the counterbore in the nut while still permitting the captive washer carried by the nut to engage one of the plates and tighten the joint. The interference lock between the bolt and the material surrounding the bolt hole thus provides a preloaded or pre-stressed condition in the material around the hole without cold working, and since the material around the hole recovers after the bolt is removed because the elastic limit is never exceeded, replacement fasteners of the same type can be used again.

It is therefore an object of the present invention to provide a locking washer-nut device comprising a threaded nut and captive washer effectively connected together by universal joint means for rotation around a common-central axis and for limited angular movement in any direction across said axis whereby to provide for correction of misalignment of the nut with respect to a surface to be abutted by the washer.

Another object of the invention is to provide a locking washer-nut device effectively including spring means defining relief or clearance notch, groove, space, or opening means effectively comprising tension-indicating means for clearly indicating the amount of tension applied to a bolt through the nut and washer, after said nut and washer are threadedly tightened down against an abutting surface having a hole therethrough carrying the bolt.

It is a further object of the invention to provide a locking washer-nut device of the character defined in the preceding object, wherein the tension-indicating means includes an extrudable resilient material mounted in the relief or clearance space and controllably extrudable as a result of the forcible deflection of the spring means as a direct function of tension applied to the bolt through the nut and washer.

Another object of the invention is to provide a locking washer-nut device comprising a threaded nut and captive washer effectively connected together by universal joint means for rotation around a common central axis and for limited angular movement in any direction across said axis whereby to provide for correction of misalignment of the nut with respect to a surface to be abutted by the washer; said washer effectively including spring means defining relief or clearance notch, groove, space, or opening means effectively comprising tension-indicating means for clearly indicating the amount of tension applied to a bolt through the nut and washer, after said nut and washer are threadedly tightened down against an abutting surface having a hole therethrough carrying the bolt.

It is a further object of the invention to provide a locking washer-nut device of the character defined in any of the preceding objects, wherein the captive washer means includes a frusto-spherical receiver portion receiving a frusto-spherical base portion of the nut and effectively providing great strength and support to the nut for preventing dilation of the nut during use in high-stressed, high-strength joints.

These and other objects of the invention not specifically set forth above will become readily apparent from the accompanying description and drawings, in which:

FIGURE 1 is a view, partly in vertical section and partly in elevation, showing two structural members or plates secured together by two locking washer-nut devices of the present invention and two tapered bolts of the type more specifically disclosed and claimed in applicant's co-pending patent application, Serial No. 733,517, filed May 7, 1958, and shows two different types of corrected misalignment of the nut with respect to the surface adapted to be forcibly abutted by the washer;

Figure 1:
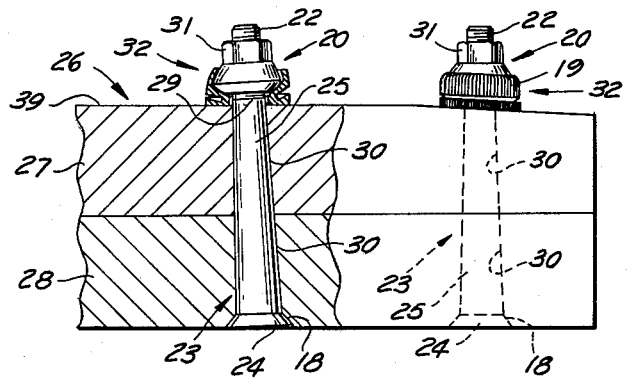
Figure 2:
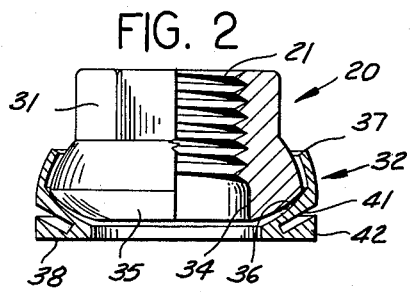
FIGURE 2 is an enlarged view, partly in vertical section and partly in elevation, illustrating the structural detail of the washer-nut shown in two different types of operative use in FIGURE 1.
Figure 3:
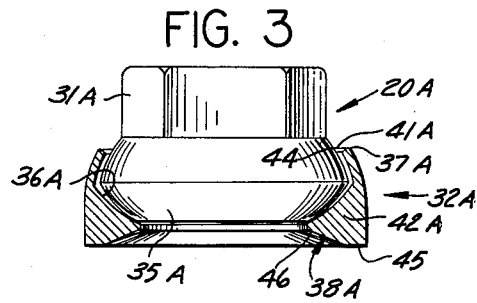
FIGURE 3 is a view, partly in vertical section and partly in elevation, similar to FIGURE 2, but illustrating a modified form of the washer-nut of the present invention.
Figure 4:
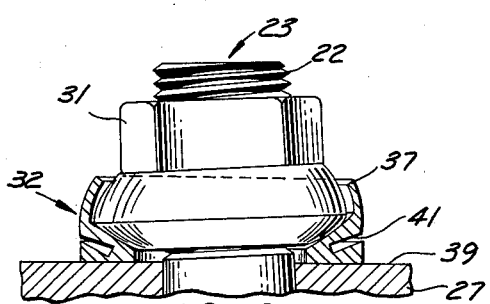
FIGURE 4 is a view, partly in vertical section and partly in elevation, illustrating the form of the invention shown in FIGURE 2 after it has been threadedly engaged with the misaligned threaded end of a bolt and has been drawn into fully locked position in abutting contact with the surface of the structural member carrying the threaded bolt (shown in fragmentary form)
Figure 5:
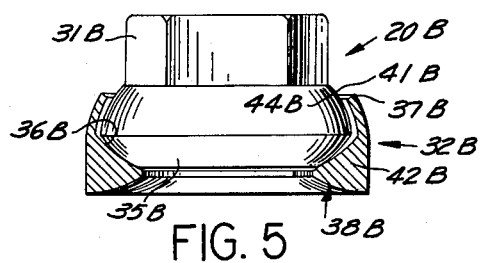
FIGURE 5 is a view similar to FIGURE 3, but illustrates a further modification thereof wherein the contacting or engaging portion of the washer is of spherical cross-sectional configuration rather than comprising an outer flat portion provided with an inner conical portion as shown in the form of the invention illustrated in FIGURE 3.
Figure 7:
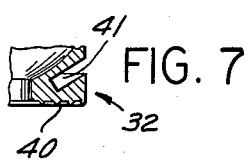
FIGURE 7 is a fragmentary sectional view taken along the line 7—7 of FIGURE 6.

FIGURE 8 is a view, partly in vertical section and partly in elevation, illustrating a further slight modification of the form of the invention illustrated in FIGURES 1, 2, and 4, wherein the clearance or relief groove means around the bottom of the washer and effectively comprising the tension-indicating means is horizontally directed and is provided with a resilient extrudable material in said groove adapted to be forcibly extruded in a manner which is a direct function of the tension applied to the threaded portion of the bolt through the nut and washer;

FIGURE 9 is a view, partly in vertical section and partly in elevation, illustrating the modified FIGURE 5 form of locking washer-nut device of the present invention in misalignment-correcting threaded engagement with the threaded end of a bolt passing through a hole in a structural member;

FIGURE 10 is a view generally similar to FIGURE 9 but illustrates the modified type of locking washer-nut device of the present invention shown in FIGURE 3;

FIGURE 11 is a top plan view of a locking washer-nut device representative of any of the forms of the invention illustrated in the other figures, wherein the top portion of the nut is deformed prior to attachment to the threaded end of a bolt so that the nut will become frictionally locked to the threaded end of the bolt as it assumes the shape of the threaded end of the bolt upon rotation of the nut thereon;

FIGURE 12 is a view, partly in vertical section and partly in elevation, illustrating a very slight modification of the form of the invention shown in FIGURES 5 and 9, this modification including a differently shaped top portion of the projecting base at the bottom of the nut adapted to provide a greater degree of freedom of angular movement of the nut with respect to the captive washer;

FIGURE 13 is a fragmentary vertical sectional view similar to FIGURE 7 but illustrating a modified form of the relief or clearance groove around the captive washer wherein said groove is of substantially V-shaped cross-sectional configuration converging toward its inner lower terminus.

One exemplary embodiment of the invention is illustrated in FIGURES 1, 2, and 4 wherein it takes a specific form including a nut, indicated generally at 20, having an interiorly threaded portion 21 threadable onto the threaded remote end portion 22 of a locking bolt 23, which has an enlarged head 24 at the opposite end of the shank portion 25, whereby to firmly attach the bolt 23 and the nut 20 with respect to structural means indicated generally at 26 which, in the example illustrated, is shown as comprising two structural members or plates 27 and 28.

In the specific example illustrated in FIGURES 1, 2, and 4, the locking bolt 23 is of tapered configuration wherein the intermediate or shank portion 25 tapers from the enlarged head 24 (which is tapered and rests in a similarly tapered countersink 18 in aerodynamically flush manner) to a terminus 29 thereof from which the threaded end portion 22 extends. It should be noted that the threaded end portion 22 is of an outside diameter no greater than the terminus 29 of the tapered intermediate shank portion 25 so as to readily pass through the hole means 30 in the structural means 26 comprising, in the example illustrated, the two plates 27 and 28. The hole means 30 is effectively tapered with precisely the same degree of longitudinal taper as the taper of the shank portion 25 of the bolt. This taper comprises a uniform taper per linear inch and it is preferred that the included taper between opposite sides of the bolt shank 25 and also between opposite sides of the hole means 30 be in the range of between 0.005 inch to 0.100 inch per inch. This taper per inch can remain the same regardless of the length or size of the bolt or can be varied to suit special circumstances or as a function of the size of the joint or the hardness of the materials of the structural members 27 and 28 effectively comprising the joint shown in FIGURE 1. When the bolt 23 is fully inserted into the hole means 30, a slight interference exists between the outer surface of the tapered shank portion 25 and the inner tapered surface of the hole means 30. This interference is preferably in the range of 0.0005 to 0.020 inch at all diameters along the length of the bolt 23, and it is understood that the more the interference, the greater the force required to draw the bolt 23 into the hole means 30 in the structural plates 27 and 28. The threaded nut 20 can be initially threaded a short distance onto the threaded end portion 22 of the tapered bolt 23 without the use of a tightening tool. Then a suitable tightening tool such as a socket wrench, or the like, may be applied to the hex shaped portion 31 at the top of the nut 20 and the nut may be forcibly threadedly advanced downwardly along the threaded portion 22 of the bolt 23 until the nut 20 and the captive washer, indicated generally at 32, are in the fully operative, firmly seated and locked relationship shown in two different misalignment-correcting arrangements in FIGURE 1 and also shown in a misalignment-correcting position in FIGURE 4. In order to facilitate this, the exterior surface of the washer 32 is shown, in the specific form illustrated in FIGURES 1, 2, and 4, as being provided with frictional means comprising a serrated or vertically knurled surface indicated at 19 which may be employed for initially holding the washer 32 while the nut 20 is tightened until such time as the bottom engaging, contacting surface 38 of the washer 32 is firmly locked against the abutted surface 39 of the structural member 27. This may be until the nut tightening operation is fully completed.

The nut 20, in the specific form illustrated in FIGURES 1, 2, and 4, is initially deformed at one or more points prior to attachment to the threaded end 22 of the bolt 23 so that the nut becomes frictionally locked to the threaded end 22 of the bolt 23 as it assumes the shape of the threaded end 22 of the bolt 23 upon threaded advancement of the nut 20. This acts to firmly lock the nut 20 in place on the threads 22 and results from elastic deformation of the top portion of the nut 20 into the circular shape of the threaded portion 22 of the bolt 23. It will be understood that before the top of the nut 20 is deformed, in the manner best shown in FIGURE 11 as indicated at 33, the diameter and pitch of the threads of the nut 20 correspond to that of the threaded end portion 22 of the bolt 23. Also, in certain forms of the invention, the base or bottom portion of the nut 20 contains a counterbore as indicated at 34 in FIGURE 2 in which no nut threads are located.

In the specific form of the invention illustrated in FIGURES 1, 2, and 4, the nut 20 is provided with a downwardly directed projecting base portion 35 which, in the preferred form shown in said figures, is of partially spherical or frusto-spherical configuration. Also, in the exemplary embodiment illustrated in FIGURES 1, 2, and 4, the captive washer means 32 is provided with an upwardly directed effectively concave or recessed received portion 36 which is illustrated, in the exemplary embodiment shown in said figures, as being of partially spherical or frusto-spherical shape which rotatably receives the frusto-spherical base portion 35 of the nut 20 for rotation around a common vertical central axis and for relative angular movement in any direction across said axis to a limited extent. It should be noted that the captive washer 32 is effectively retained in said relationship with respect to the nut 20 by means of upwardly and inwardly directed retaining lip means 37 partially encompassing the upper part of the base portion 35 of the nut 20 for preventing removal of same from the captive washer 32 while allowing rotation and relative angular movement thereof. It should be noted that the device is assembled by initially having the retaining lip means 37 substantially vertically directed in a cylindrical manner to allow downward insertion of the frusto-spherical base portion of the nut 20 thereinto, after which the retaining lip means 37 is partially formed or bent inwardly into the spaced retaining position clearly shown in FIGURES 2 and 4.

In the specific exemplary form of the invention illustrated in FIGURES 1, 2, and 4, the spherical radius of curvature of the lower surface of the base portion 35 of the nut 20 is greater than the spherical radius of curvature of the receiver portion 36 of the captive washer 32, and the two spherical radii are concentric on a common vertical center line or axis for both the nut 20 and the washer 32.

Figure 6:
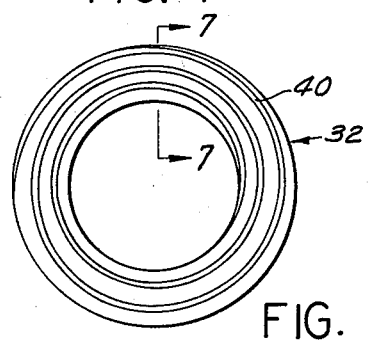
FIGURE 6 is an enlarged bottom view of one form of frictional means carried by the flat bottom contacting or engaging surface of the type of washer shown in FIGURES 1, 2, and 4 and adapted to prevent rotation of the washer when it is in abutting contact with the surface of the structural member in the position shown in FIGURE 4.

The captive washer 32 has the lower contacting or engaging surface means 38 which is adapted to be forcibly advanced into locked abutment with an outside surface of a structural member or means, such as the outside surface indicated at 39 in FIGURES 1 and 4, whereby to rotatively immobilize the captive washer 32 while allowing relative rotation of the nut 20 so as to draw the bolt 23 firmly into the locked position shown in full in FIGURE 1 and shown fragmentarily in FIGURE 4, with the relative angular adjustment of the nut 20 with respect to the captive washer 32 compensating for misalignment of the bolt 23 with respect to the abutted surface 39. In certain forms of the invention, the contacting or engaging surface means 38 may be provided with frictional means such as the spiral surface irregularities indicated at 40 in FIGURES 6 and 7 to further decrease any possibility of the washer 32 turning during rotation of the nut 20.

The locking washer nut device of the present invention also includes relief or clearance means effectively defined by spring means and adapted to dimensionally vary in response to forced abutment of the washer 32 against the abutted surface 39. In the specific example illustrated in FIGURES 1, 2, and 4, said relief or clearance means comprises the circular, angularly, downwardly and inwardly inclined groove 41 carried by the washer 32 below the receiver portion 36 and above the contacting or engaging surface means 38 whereby to effectively define therebetween the cantilever spring means 42 comprising the portion of the washer positioned between the notch 41 and the bottom or contact surface 38, which is positioned for forcible upward deflection as a result of being drawn into forced engagement with the abutted surface 39 in response to threaded advancement of the nut 20 along the threaded end 22 of the bolt 23. This is clearly shown in FIGURES 1 and 4 where the relief or clearance groove 41 is shown slightly compressed as a result of threaded advancement of the nut 20.

The relief or clearance groove 41 effectively comprises tension-indicating means wherein the clearance space varies as a direct function of tension applied to the bolt 23 by the nut 20 and the washer 32. Therefore, said tension can be measured by using thickness gauges, or the like, or various thicknesses of shim material insertible into the groove 41 to determine the clearance therein and calibrated in tension. Also, as a modification, the tension-indicating groove 41 may be provided with resilient compressible extrudable material, such as that shown at 43 in FIGURE 8, adapted to be extruded therefrom in response to and in direct correlation with tension applied to the bolt by the nut and washer.

As previously noted, in the form of the invention illustrated in FIGURES 1, 2, and 4, the radius of curvature of the base portion 35 of the nut 20 is greater than the radius of curvature of the receiver portion 36 of the washer 32. In order to clarify this feature, it should be noted that the spherical radius of curvature of the nut base 35 may equal the nominal diameter of the threads plus 0.050 inch in the case of an 5/32 thread. This is to be increased by 0.010 inch for each larger size. In this case, the spherical radius of curvature of the receiver portion 36 may equal the nominal diameter of the threads plus 0.025 inch in the case of such an 5/32 thread. This is to be increased by 0.005 inch for each larger size. However, this is exemplary only and is not to be construed in a limiting sense.

FIGURES 3 and 10 illustrate a slightly modified form of the invention wherein similar parts are designated by similar reference numerals, followed by the letter "A," however. In this modification, the nut 20A and the frusto-spherical base portion 35A are substantially identical to that previously described in the first form of the invention illustrated in FIGURES 1, 2, and 4. However, in this modification the washer 32A is of modified form not having a circular groove around the bottom portion thereof as shown at 41 in the first form of the invention illustrated in FIGURES 1, 2, and 4. In this modification, the relief or clearance means, which took the form of the circular groove 41 in the first version of the invention, comprises a circular opening 41A defined between the retaining lip portion 37A and the upper part 44 of the base portion 35A of the nut 20A. In this modification, the contacting or engaging surface means 38A at the bottom of the washer 32A comprises a flat outer initial contact portion 45 and an inner conical subsequent contact portion 46 adapted to be progressively forcibly resiliently effectively rotatively moved into contact position with the abutted surface 39A in the manner best shown in FIGURE 10 as a result of forced advancement of the washer 32A against the abutted surface 39A in response to threaded advancement of the nut 20A on the threaded portion 22A of the bolt 23A. Therefore, in this form of the invention, the spring portion effectively comprises the side wall 42A of the captive washer 32A, which deflects from the undeflected position shown in FIGURE 3 into the deflected position shown in FIGURE 10 during forced abutment of the captive washer 32A against the abutted surface 39A. This effectively causes the clearance opening 41A to be reduced in size whereby to effectively comprise tension-indicating means which can be measured with a thickness gauge calibrated in tension or direct measurement or which can be measured by providing it with extrudable material of the type shown at 43 in FIGURE 8 (positioned, however, in the clearance opening 41A of FIGURES 3 and 10) whereby to cause it to be controllably extruded as a direct function of the tension applied to the bolt 23A through the nut 20A and the washer 32A.

FIGURES 5 and 9 illustrate a further slight modification of the invention very similar to the form illustrated in FIGURES 3 and 10 except that, in this modification, the contacting or engaging surface means 38B is of partially spherical configuration rather than having an outer flat portion such as that shown at 45 in FIGURES 3 and 10 and an inner conical upwardly and inwardly inclined portion such as that shown at 46 in FIGURES 3 and 10. Since this version is quite similar to the modification illustrated in FIGURES 3 and 10 described hereinbefore, similar parts are illustrated by similar reference numerals, followed by the letter "B," however.

It should be clearly noted that, in the version of the invention illustrated in FIGURES 1, 2, and 4, the frusto-spherical base portion 35 bears on an outer part of the frusto-spherical receiver portion 36 whereas in the form of the invention illustrated in FIGURES 3 and 10, the frusto-spherical base portion 35A of the nut 20A bears on an inner portion of the frusto-spherical receiver portion 36A. This is also true of the form illustrated in FIGURES 5 and 9.

FIGURE 8 illustrates a form of the invention very similar to that shown in FIGURES 1, 2, and 4, and similar parts are indicated by similar reference numerals, followed by the letter "C," however. In this modification, the notch or groove means 41C lies in a horizontal plane rather than being downwardly and inwardly angularly inclined as shown in the first form of the invention. Also, as previously mentioned, in this form, said groove 41C may be provided with the extrudable resilient compressible tension-indicating material 43 which may be rubber, nylon, Teflon, or any other suitable material adapted to be forced horizontally outwardly to an extent which is a direct function of the tension applied to the bolt 23C by the nut 20C and the washer 32C.

FIGURE 12 illustrates a further modified form of the invention which is very similar to the form of the invention illustrated in FIGURES 5 and 9 and, therefore, similar parts are indicated by similar reference numerals, followed by the letter "D," however. The major difference of this modification from the form illustrated in FIGURES 5 and 9, is the fact that the upper portion 44D of the frusto-spherical base 35D of the nut 20D projects outwardly in a manner providing greater clearance with respect to the retaining lip means 37D whereby to provide greater freedom for relative angular movement of the nut 20D with respect to the captive washer 32D while positively retaining them together.

FIGURE 13 is a fragmentary view quite similar to FIGURE 7 and merely illustrates a slightly modified form of the relief or clearance groove which is indicated by the reference numeral 41 in FIGURE 7 and which is indicated by the reference numeral 41E in FIGURE 13. It will be noted that in FIGURE 13 said notch 41E is of substantially V-shaped cross-sectional configuration converging downwardly and inwardly toward its lower inner terminus whereas the notch 41 in the first form of the invention is of substantially uniform cross-section and is of a non-converging type.

The bolts adapted to be engaged by the locking washer-nut device of the present invention are preferably fabricated of any suitable high-strength alloy steel or metal which can be heat treated to between 170,000 and 190,000 p.s.i. or higher and the nuts, such as shown at 20 in FIGURES 1, 2, and 4, for example, are also fabricated in certain preferred forms of the invention of any suitable high-strength alloy steel or metal which can be heat treated to between 140,000 and 160,000 p.s.i. or proportionately higher. The high-strength alloy steel is machined or formed in the annealed or normalized state before heat treatment. One such suitable steel is 4140 Chrome Molybdenum steel listed in MIL-S-5626 of the National Aircraft Standards Committee, but generally alloy steels such as chrome-nickel-molybdenum, or chrome-vanadium steels can also be utilized. In certain cases, titanium alloys are employed. Also, as previously mentioned, in certain instances all or certain portions of the locking washer-nut device of the present invention may be formed of aluminum alloys or similar suitable materials. But this is generally so where a number of such locking washer-nut devices will be employed in order to distribute the stresses. In instances where relatively few locking washer-nut devices are to be employed, heat treated alloy steels, or the like, will normally be the preferred material.

Various modifications are contemplated by those skilled in the art without departing from the spirit and scope of the present invention as hereinafter defined by the appended claim.

What is claimed is:

A self-aligning tension-indicating locking washer-nut device comprising a nut having an interiorly threaded portion threadable onto a threaded end portion of a bolt, said nut being provided with a base portion having complimentary frusto-spherical sections mounted in opposition to each other to form an integral wall inclined outwardly from the upper and the lower portions thereof to a maximum diameter intermediate said upper and lower portions, and captive washer means provided with a receiver portion having a partially spherical recess rotatably receiving and retaining said base portion for rotation around a common central axis and for relative angular movement across said common central axis in any desired direction, said lower portion of said frusto-spherical sections on said nut base having a radius of curvature different from the radius of curvature of said partially spherical recess in said washer, said radius of curvature of said lower portion of said frusto-spherical sections on said nut being greater than said radius of curvature of said partially spherically recess, the centers of spherical curvature of the base portion and the receiver portion lying on said common central axis when aligned, said captive washer being provided with retaining lip means extending axially upward from said recess and partially encompassing the base portion of the nut, said retainer lip means overlying said upper portion of said frusto-spherical sections of said base portion of said nut for preventing removal of same from the captive washer, said washer being provided with surface-engageable means at the end thereof most remote from the base portion of the nut for forcible abutting contact with an outside abutable surface of structural means, said washer including spring means defining a variable clearance annular groove means having spaced walls and being located in the exterior peripheral wall of said washer, said annular groove being situated axially below said recessed receiver portion and for forcible deflection toward said nut as a result of being drawn into forced engagement with said outside abutable surface in response to threaded advancement of the nut along the threaded end portion of the bolt, the force necessary to cause said spaced walls to approach each other a specific amount being predetermined whereby the tension in said bolt is indicated.

(References on following page)

References Cited in the file of this patent

UNITED STATES PATENTS

| | | |
|---|---|---|
| 351,474 | Stevens et al. | Oct. 26, 1886 |
| 1,567,649 | Hultgren et al. | Dec. 29, 1925 |
| 2,128,844 | Myer et al. | Aug. 30, 1938 |
| 2,440,409 | Lehmann | Apr. 27, 1948 |
| 2,495,409 | Costello | Jan. 24, 1950 |
| 2,546,332 | Costello | Mar. 27, 1951 |
| 2,570,863 | Rowl | Oct. 9, 1951 |
| 2,897,867 | La Torre | Aug. 4, 1959 |
| 3,087,371 | Orner | Apr. 30, 1963 |

FOREIGN PATENTS

| | | |
|---|---|---|
| 527,435 | Belgium | Apr. 15, 1954 |
| 1,029,102 | France | Mar. 4, 1953 |
| 502,459 | Italy | Nov. 30, 1954 |